A. W. CALVIN.
SIDE BEARING.
APPLICATION FILED APR. 8, 1920.

1,364,426.

Patented Jan. 4, 1921.
3 SHEETS—SHEET 1.

INVENTOR
Albert W. Calvin
by R.D. Little
his attorney

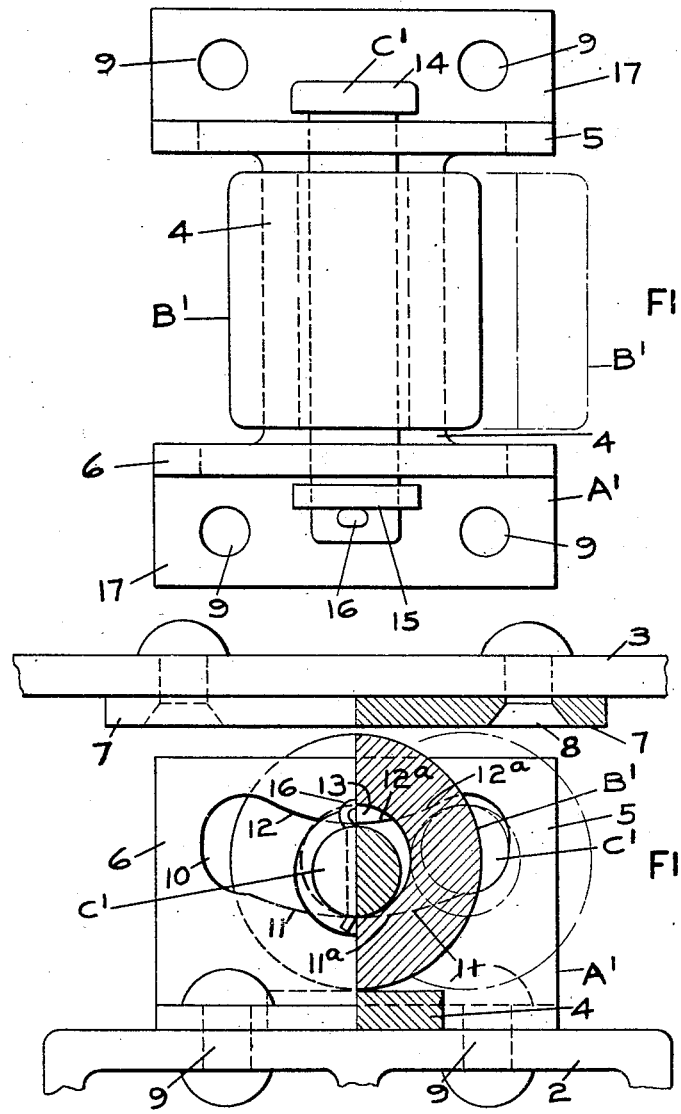

A. W. CALVIN.
SIDE BEARING.
APPLICATION FILED APR. 8, 1920.
1,364,426.
Patented Jan. 4, 1921.
3 SHEETS—SHEET 3.
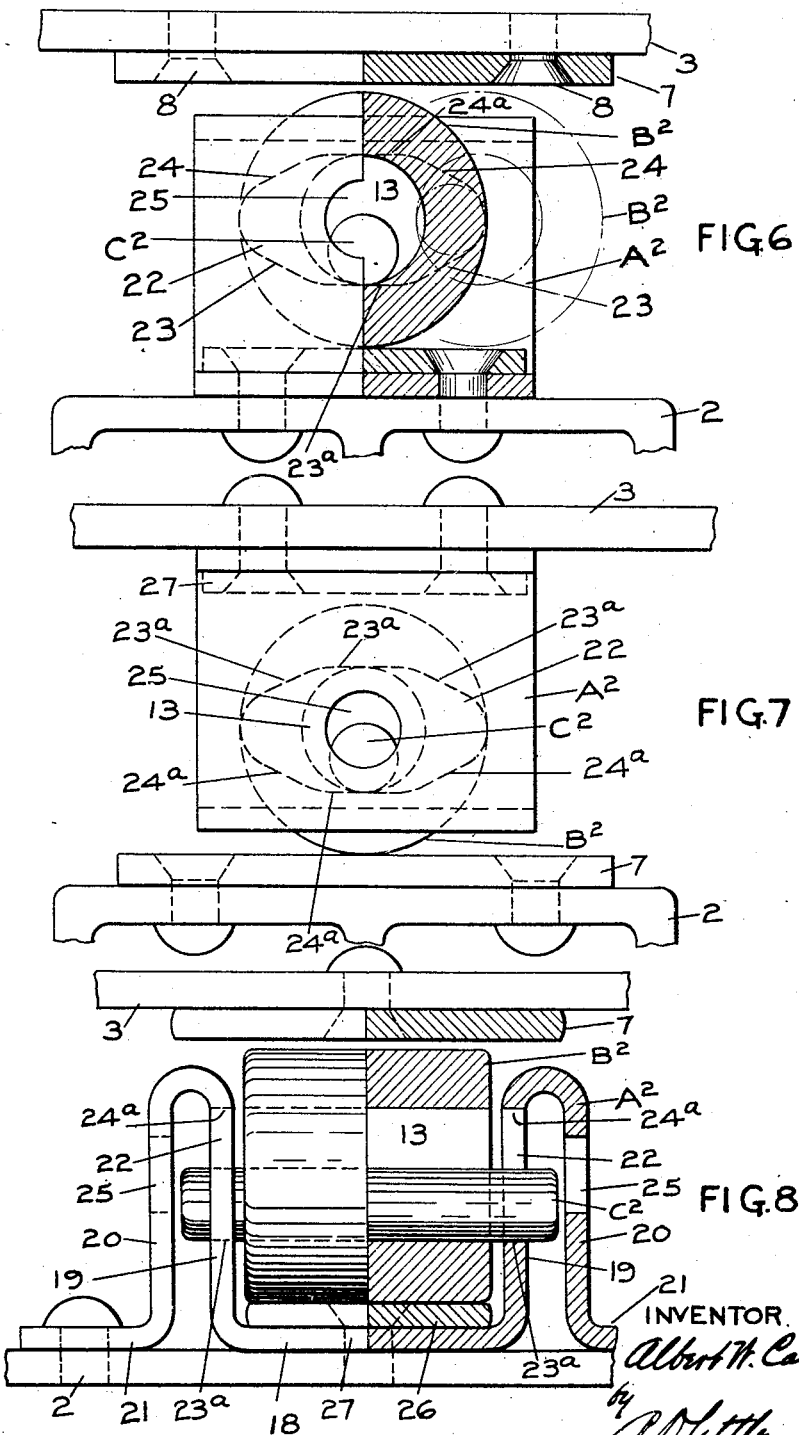
INVENTOR.
Albert W. Calvin
by
his Attorney

UNITED STATES PATENT OFFICE.

ALBERT W. CALVIN, OF PITTSBURGH, PENNSYLVANIA.

SIDE BEARING.

1,364,426.     Specification of Letters Patent.     Patented Jan. 4, 1921.

Application filed April 8, 1920. Serial No. 372,144.

*To all whom it may concern:*

Be it known that I, ALBERT W. CALVIN, a citizen of the United States, and resident of Pittsburgh, in the county of Allegheny and State of Pennsylvania, have invented certain new and useful Improvements in Side Bearings, of which the following is a specification.

My invention relates to the construction and arrangement of the parts of anti-friction side bearings of the class used on the rolling stock of steam, electric and similar railways.

One object of my invention is to provide a side bearing which has an unlimited amount of travel, and wherein the anti-friction member of the bearing has a differential lateral movement during the full normal angular movement of the car bolsters and is free to rotate when the normal angular travel of the car bolsters is exceeded.

Another object of this invention is the provision of an anti-friction side bearing wherein the use of cast metal is avoided and all of the parts of the bearing may be made from standard rolled steel shapes which are readily obtained and which are made adaptable for use in fabricating or assembling the side bearings, with a minimum amount of machining and corresponding reduction in cost.

Another object of the invention is the provision of an anti-friction side bearing wherein the amount of material used in its construction is lessened and is reduced to a minimum without sacrifice in strength and durability.

A further object of my invention is to provide an anti-friction side bearing having an unlimited amount of travel regardless of the extent of relative angular movement of the car bolsters to which the bearing is applied for use.

A still further object of this invention is the provision of a side bearing having an anti-friction roller and having novel means whereby the roller is easily and quickly removed and replaced when desired, and whereby the necessity of lifting the body bolster of the car relative to the truck bolster in order to renew the anti-friction roller is avoided and overcome.

A still further object of my invention is the provision of an anti-friction side bearing having the novel construction, combination and arrangement of parts shown in the drawings, to be described in detail hereinafter and to be particularly specified in the appended claims.

In the accompanying drawings, forming part of this specification, Figure 1 is a plan showing one form of side bearing embodying my invention.

Fig. 4 is a plan of a modified form of side bearing embodying the novel features of my invention.

Fig. 5 is a side elevation of the modified bearing of Fig. 4, with the right hand half thereof in cross-section.

Fig. 6 is a side elevation showing a further modified form of bearing as applied for use on the truck bolster of a car, the right hand half of the figure being in cross-section.

Fig. 7 is a side elevation, similar to that of Fig. 6, showing the side bearing of Fig. 6 inverted and applied for use on the body bolster of a car.

Fig. 8 is an end elevation of the bearing of Fig. 6 with the right hand half thereof in cross-section.

Figure 1:
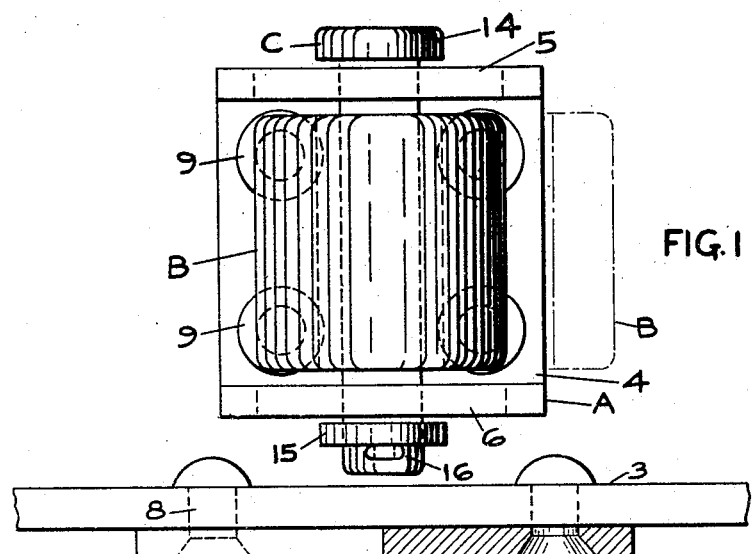
Figure 2:
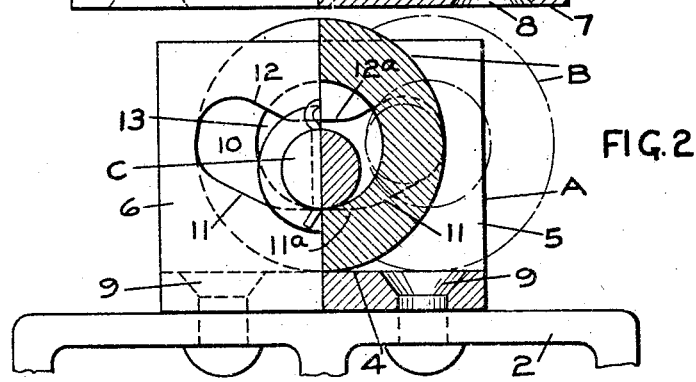
Fig. 2 is a side elevation, of the construction of Fig. 1, with the right hand half thereof in cross-section.
Figure 3:
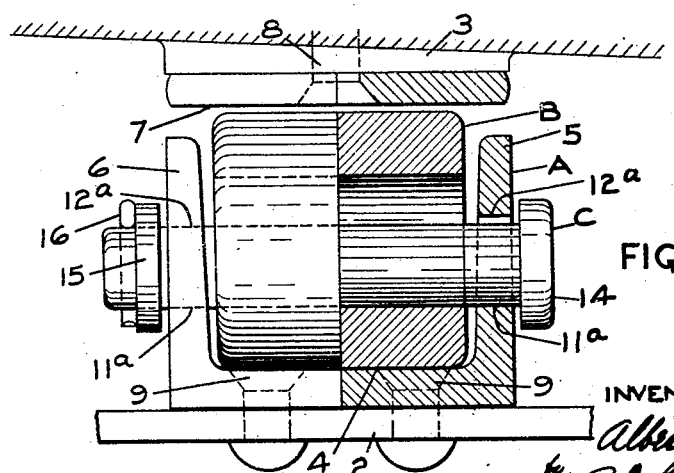
Fig. 3 is an end elevation of the bearing illustrated in Figs. 1 and 2, with the right hand half of the figure in cross-section.

Referring now in particular to Figs. 1, 2, and 3 of the drawings, the side bearing shown, which embodies my invention, is operatively mounted between adjacent end portions of the truck bolster 2 and body bolster 3 of a railway car. This bearing comprises a cage A, anti-friction roller B, and gravity return roller C. The short length of standard rolled steel channel beam forming the cage A, has a web which forms one bearing surface 4 for the roller B, and integral flanges forming the vertical side walls 5 and 6 thereof. The other or top bearing surface 7 of the bearing which is formed of a short length of rolled flat steel bar, a standard rolled shape, is secured to the body bolster 3 by means of rivets 8.

The anti-friction roller B, which is interposed between the top bearing surface 7 and bottom bearing surface 4 of the bearing, is annular in cross-section, and is loosely mounted within the cage A so as to roll on the flat, plane bearing surfaces 4 and 7.

Being of annular cross-section this roller A is balanced and will not roll or move until acted upon by some outside force.

As shown, the cage A has a bottom bearing surface 4 with parallel, vertical side walls 5 and 6, and is fastened on the truck bolster 2 by rivets 9, the heads of these rivets being countersunk so as to not project above the plane of the upper face of the lower bearing surface 4. The cage A being formed of a piece of rolled steel channel beam, has open ends and one open side, and the anti-friction roller B projects upwardly above the plane of the upper edges of the flanges forming the sides 5 and 6 of the cage, so as to be engaged by the upper bearing surface 7.

The heads of the rivets 8 for fastening the bar forming the bearing surface 7 are countersunk in the same manner as the rivets 9.

Extending through each side wall of the cage is an elongated opening or slot 10, the slots in the opposite side walls 5 and 6 being in horizontal alinement. The lower edges 11 of these slots curve or incline downwardly from each end toward the middle of the length of the slots, and the inclined edges 11 intersect a short intermediate section 11ª which extends horizontally. The inclined upper edges 12 of these slots are parallel to the edges 11 and the intermediate portion 12ª is parallel to the edge 11ª. The slots 10 in the opposite side walls 5, 6 are in horizontal alinement, and extending through these slots and through the opening 13 in the annular anti-friction roller B is the pin or bolt forming the gravity return roller C, this roller having a head 14 on one end and a loose washer or collar 15 on the other, which form abutments on the exterior of the cage A and add weight to the gravity roller C. The collar 15 is detachably secured on the roller B by means of a cotter pin 16, which extends through a transverse hole in the end of the pin or roller.

By reference to Figs. 1 to 3, it will be seen that the gravity return roller C engages with the cylindrical inner surface of the hole 13 in the annular roller B and with the lower edge 11, 11ª of the slots 10, so that when relative swiveling movement of the bolsters 2 and 3 occurs, and the balanced roller B is moved thereby, the gravity return roller C is caused to ride upward on the inclined edges of the slots 10. It also will be readily seen that when the bolster 3 lifts clear of the roller B the gravity return roller C will roll down the inclined edges of the slots 10, and will automatically engage with and return the anti-friction roller B into its central position, or that shown in full lines in Figs. 1 and 2.

It will be obvious that by reversing the angle of inclination of the edges of the slots 12 in the side walls 5 and 6 of the cage A the cage can be fastened to the body bolster 3 instead of to the truck bolster 2, as is shown. It will also be obvious that the roller B may be readily removed and replaced in making repairs or renewals, without the necessity of separating the body and truck bolsters by jacks or similar lifting appliances, as is now the practice. In order to remove the roller B of the present construction it is only necessary to remove the cotter-pin 16 and collar 15 and withdraw the gravity roller C, and to then push or roll the roller B from its position within the cage A, there being no end walls on the cage to prevent the free removal of this roller B. This feature is an important improvement over any bearings heretofore constructed since the anti-friction rollers are continually wearing out or being broken and must be replaced, and to do this necessitates jacking up or lifting the car sufficiently to allow the removal of the roller, while with the present construction the operation takes but a few moments and does not require the car being lifted relative to the car trucks.

The modified bearing illustrated in Figs. 4 and 5 is very similar to that of Figs. 1, 2, and 3. The annular anti-friction roller B' is like the roller B and the gravity return roller C' the same as the roller C. The cage A' of the bearing of Figs. 4 and 5 differs from the cage A of the preceding figures in the cross-section of the channel beam from which the cage is made, in the length of the web forming the bottom surface for the roller B' relative to the length of travel of this roller in the cage, and in the contour of the inclined openings or slots forming guideways in the cage for the gravity return roller C'.

By referring to Figs. 4 and 5 it will be seen that the short length of rolled steel channel beam forming the cage A' not only has a web 4 integrally formed with the flanges forming the sides 5 and 6 of the cage, and that the cage has open ends and one open side, but that in addition there is a flange 17 on each side of the channel, on the outside of the flanges 5 and 6, which projects outwardly therefrom, with the bottom surfaces of the flanges 17 in the plane of the bottom surface of the web 4. The web 4 has a thickness somewhat greater than that of the flange 17, and it is cut away at each end so as to be shorter than the flanges forming the sides 5 and 6 of the cage. Shortening the length of the web or bearing surface 4 in this manner enables the roller B' to be free therefrom, during the rotation of this roller, which occurs when the truck bolster 2 swivels relative to the body bolster 3 to a greater extent than the normal amount. It also will be seen by reference to Fig. 5 that the curved or inclined lower edges 11 of the grooves 10 in the sides of the cage do not tangent the curved ends of the slots, so that the gravity return roller C', when in the position shown by dotted lines in Fig. 5, will coact with the top bearing surface 7 on the body bolster to support the roller B' so that it is clear of the bottom wearing surface 4. The bearing of Figs. 4 and 5 is secured on the truck bolster 2 between adjacent end portions of the truck bolster and body bolster, and the upper bearing plate or surface 7 is secured by countersunk rivets 8 to the body bolster in the same manner as in Figs. 1, 2, and 3.

In the modification of Figs. 6, 7, and 8, the cage $A^2$ is constructed differently from the bearing cages A and A' of the preceding figures, and the gravity return roller $C^2$ does not have the head or the washer and cotter-pin of the rollers C and C'. The anti-friction roller $B^2$ is the same as the rollers B and B' of Figs. 1 to 5.

The cage $A^2$ is made by bending a flat steel bar so as to form a horizontal side portion 18 and inner side portions 19 which are parallel and extend vertically or at right angles to the side 18. The portions 19 of the bar also are doubled upon themselves so as to form outer side portions 20 which are separated slightly from and extend parallel with adjacent inner side portions 19. The ends of the bar are bent outwardly to extend at right angles to the side portions 19 and 20 of the cage, in the plane of the intermediate portion forming the horizontal side 18, to form feet 21 by which the cage is fastened to the truck bolster or body bolster of the car. It will be noted that this cage $A^2$, like the cages A and A', has open ends and one open side. Each of the inner side portions 19 is provided with an elongated slot 22 forming a guideway for the plain cylindrical bar forming the gravity return roller $C^2$. Each of the edges 23 and edges 24 defining the width of these slots 22 is inclined outwardly from the end toward the middle of the length thereof, and intersect an intermediate portion $23^a$, $24^a$. In this cage $A^2$ both longitudinal edges 23, 24 are made to incline and to intersect with an intermediate horizontal portion $23^a$ or $24^a$, this construction enabling the bearing to be used as a truck bolster bearing as shown in Figs. 6 and 8, and also by simply inverting it, as a body bolster bearing, as shown in Fig. 7. The outer portions 20 of the sides of the cage do not have elongated slots, but are provided with smaller circular holes 25 through which the bar forming the gravity return roller $C^2$ is inserted in the longitudinal slots 22. (See Fig. 8). In the bearing of Figs. 6 and 8 the cage is provided with a renewable bearing plate 26 which is fastened to the intermediate portion 18 of the cage by rivets 27, and a bearing plate 7 is fastened by rivets 8 to the under side of the end of the body bolster 3. The rivets for fastening the bearing plates are countersunk so as to not project beyond the plane of the bearing surface engaged by the anti-friction roller $B^2$, in the same way as in the other figures.

After the roller $B^2$ is placed in the cage $A^2$, the roller $C^2$ will be inserted into place by passing it through the circular holes 25 in one or the other of the outer side members 20. The roller will then rest on the guideway formed by the edges $23^a$ of the elongated slots 22 as shown in Figs. 6, 7, and 8 of the drawings. The width of the slots 22 being greater than the diameter of the holes 25, the gravity return roller $C^2$ will be prevented from becoming displaced by engagement of its ends with the inner faces of the side portions 19 of the cage. (See Fig. 8).

In applying this bearing for use as a body bolster, the cage $A^2$ will be inverted and fastened to the body bolster 3, and the bearing plate will be secured to the truck bolster 2, or in the manner shown by Fig. 7.

The operation of side bearings embodying my invention will now be described.

When the end of the body bolster 3 is disengaged from the roller B, this roller is free to move within the cage A, and the gravity return roller C will roll down the guideways in the sides of the cage and move the roller B into its central position, (that shown by full lines in Figs. 2, 5, 6, and 7). When the truck swivels under the car and the end of the body bolster swings downwardly into engagement with the anti-friction roller B, this roller travels bodily on the lower bearing plate of the cage A into or toward the position shown by dotted lines in Figs. 2, 5, and 6.

Movement of the roller A in this way causes the gravity return roller C to roll upwardly on the inclined edges of the slots forming its guideway in moving toward the ends of the slots forming the guideway, practically without friction. When the body bolster lifts so as to free the roller B, the gravity return roller C acts to move the roller B into its central position, as has been described, in readiness to again receive the load from the body bolster.

Under abnormal conditions as, for example, when a car travels around a very short curve in a railway track, the swiveling movement of the truck first rolls the anti-friction roller B in the cage A until the gravity return roller engages with the ends of the slots in the side walls of the cage A and any further swiveling movement causes the anti-friction roller B to rotate on the roller C. Rotation of the roller B when in this position is facilitated by the omission of ends in the cage A which, by frictional engagement therewith, would retard the free rotation of the roller B, and, in the construction of Figs. 4 and 5, because the roller B is out of contact with the lower bearing surface 4 in the cage A'. The support afforded the gravity return roller C' by the peculiar contour of their edges at the end of the slots 10 of the cage A' also tends to maintain the roller B' out of engagement with the short bearing surface 4 of the cage A' and permit the roller B' to rotate freely.

The many advantages of my improved side bearing will be readily appreciated by those skilled in the art. By making the parts of the bearing entirely of wrought metal, the use of castings is avoided and the strength and durability necessary to enable the bearing to withstand the shocks caused by abnormal relative angular travel of the bolsters is made possible.

The bearing is simple and is easily and quickly constructed from standard rolled or forged metal shapes which are readily obtainable in the open market, with a minimum amount of machine work and resultant reduction in cost.

Various modifications may be made in the construction and arrangement of the parts of the bearing without departing from my invention as defined in the appended claims.

I claim:—

1. An anti-friction side bearing comprising an annular, wrought metal, anti-friction roller, a wrought metal cage in which said roller is movably mounted, said cage having open ends and having opposite vertical sides, and said vertical sides having elongated slots therein with the longitudinal edges of the slots inclined from the ends toward the middle of the length thereof, a wrought metal gravity return roller extending through said annular anti-friction roller and through said slots to secure the roller in the cage, said gravity return roller being arranged to roll on the inclined edges of said slots and being adapted to automatically maintain said anti-friction roller midway of the length of said cage, and upper and lower bearing plates for said anti-friction roller, one of said plates being on said wrought metal cage.

2. An anti-friction side bearing comprising a length of drawn seamless steel tubing forming an anti-friction roller, a length of rolled steel channel beam having a web and integral flanges forming a cage in which said anti-friction roller is movably mounted, said integral flanges having elongated slots therein with the longitudinal edges of the slots inclined from the ends toward the middle of the length thereof, a forged steel pin forming a gravity return roller extending through said slots and through said cage to secure the roller in the cage, said gravity return roller being arranged to roll on the inclined edges of said slots and being adapted to automatically return said anti-friction roller to a position midway of the length of the cage when moved out of said position in the operation of the bearing, and upper and lower bearing plates for said anti-friction roller, one of said plates being on said cage.

3. An anti-friction side bearing comprising a length of drawn seamless steel tubing forming an anti-friction roller, a length of rolled steel channel beam having a web and integral flanges forming a cage in which said anti-friction roller is movably mounted, said integral flanges having elongated slots therein with the longitudinal edges of the slots inclined from the ends toward the middle of the length thereof, a forged steel pin forming a gravity return roller extending through said slots and through said cage to secure the roller in the cage, said gravity return roller being arranged to roll on the inclined edges of said slots and being adapted to automatically return said anti-friction roller to a position midway of the length of the cage when moved out of said position in the operation of the bearing, upper and lower bearing plates for said anti-friction roller, one of said plates being on said cage, and the bearing plate on the cage being shorter than the sides thereof to permit the roller to rotate on the gravity return roller, when said roller is at the ends of the slots in the sides of said cage.

In testimony whereof I have hereunto set my hand.

ALBERT W. CALVIN.

Witness:
ALICE A. TRILL.